(12) United States Patent
Tang

(10) Patent No.: US 6,909,265 B2
(45) Date of Patent: Jun. 21, 2005

(54) METHOD, APPARATUS AND SYSTEM FOR PREDICTIVE POWER REGULATION TO A MICROELECTRONIC CIRCUIT

(75) Inventor: Benjamim Tang, Hawthorne, CA (US)

(73) Assignee: Primarion, Inc., Tempe, AZ (US)

( * ) Notice: Subject to any disclaimer, the term of this patent is extended or adjusted under 35 U.S.C. 154(b) by 0 days.

(21) Appl. No.: 10/104,227

(22) Filed: Mar. 21, 2002

(65) Prior Publication Data

US 2002/0135962 A1 Sep. 26, 2002

Related U.S. Application Data

(60) Provisional application No. 60/277,494, filed on Mar. 21, 2001, and provisional application No. 60/277,496, filed on Mar. 21, 2001.

(51) Int. Cl.[7] .................................................. G05F 1/56
(52) U.S. Cl. ........................ 323/274; 323/272; 363/16
(58) Field of Search .................... 361/111, 90, 91, 361/92.2, 172, 93.2, 96; 323/266, 284, 274, 268, 282, 283, 285, 272; 700/293, 294, 295, 291, 292, 297; 320/108, 109; 363/37, 51, 49, 46, 16, 27, 19

(56) References Cited

U.S. PATENT DOCUMENTS

| | | | |
|---|---|---|---|
| 5,309,461 A | * | 5/1994 | Call et al. ................. 372/38.09 |
| 5,629,608 A | | 5/1997 | Budelman |
| 5,806,055 A | * | 9/1998 | Zinda, Jr. ..................... 706/45 |
| 5,926,394 A | | 7/1999 | Nguyen et al. |
| 6,028,417 A | | 2/2000 | Ang et al. |
| 6,112,136 A | * | 8/2000 | Paul et al. ................... 700/293 |
| 6,130,526 A | * | 10/2000 | Yang et al. .................. 323/272 |
| 6,472,855 B2 | * | 10/2002 | Ball ........................... 323/282 |
| 6,548,985 B1 | * | 4/2003 | Hayes et al. ................. 320/108 |

OTHER PUBLICATIONS

Evaluation Tool Demonstrates DeCAPitator Performance (HIP6200EVAL1). Publication by intersil (Author: Greg J. Miller Aug. 1998.*

Intersil, "Transient Voltage Regulator DeCAPitator", Feb. 1998, Data Sheet, pp. 2–441 through 2–449.

Intersil, "Evaluation Tool Demonstrates DeCAPitator Performance (HIP6200EVAL1I)", Aug. 1998, Application Note, pp. 4–58 through 4–66.

* cited by examiner

Primary Examiner—Rajnikant B. Patel
(74) Attorney, Agent, or Firm—Theodore E. Galanthay (57) ABSTRACT

A transient suppression system is configured for providing power regulation to a microelectronic device. A pre-adjust stage is configured to pre-charge or pre-discharge a bypass capacitor as driven by a predictive transient event signal and in anticipation of a transient event.

28 Claims, 4 Drawing Sheets

| Atom No. | | Atom Type | A.A. Type | A.A.# | X | Y | Z | OCC | B |
|---|---|---|---|---|---|---|---|---|---|
| ATOM | 1 | CB | SER | 8 | -0.421 | 63.744 | 24.899 | 1.00 | 50.68 |
| ATOM | 2 | OG | SER | 8 | -0.752 | 63.605 | 23.524 | 1.00 | 50.85 |
| ATOM | 3 | C | SER | 8 | 1.865 | 64.216 | 24.094 | 1.00 | 50.72 |
| ATOM | 4 | O | SER | 8 | 2.308 | 63.644 | 23.102 | 1.00 | 51.79 |
| ATOM | 5 | N | SER | 8 | 1.473 | 63.793 | 26.507 | 1.00 | 50.36 |
| ATOM | 6 | CA | SER | 8 | 1.057 | 63.446 | 25.120 | 1.00 | 50.55 |
| ATOM | 7 | N | GLN | 9 | 2.041 | 65.515 | 24.314 | 1.00 | 49.84 |
| ATOM | 8 | CA | GLN | 9 | 2.831 | 66.312 | 23.385 | 1.00 | 48.95 |
| ATOM | 9 | CB | GLN | 9 | 2.983 | 67.745 | 23.895 | 1.00 | 49.08 |
| ATOM | 10 | CG | GLN | 9 | 3.676 | 68.686 | 22.925 | 1.00 | 50.25 |
| ATOM | 11 | CD | GLN | 9 | 3.206 | 70.127 | 23.085 | 1.00 | 51.06 |
| ATOM | 12 | OE1 | GLN | 9 | 2.037 | 70.433 | 22.846 | 1.00 | 51.38 |
| ATOM | 13 | NE2 | GLN | 9 | 4.112 | 71.017 | 23.499 | 1.00 | 51.44 |
| ATOM | 14 | C | GLN | 9 | 4.190 | 65.633 | 23.294 | 1.00 | 48.56 |
| ATOM | 15 | O | GLN | 9 | 4.884 | 65.741 | 22.285 | 1.00 | 48.75 |
| ATOM | 16 | N | VAL | 10 | 4.560 | 64.926 | 24.361 | 1.00 | 47.77 |
| ATOM | 17 | CA | VAL | 10 | 5.823 | 64.198 | 24.392 | 1.00 | 46.87 |
| ATOM | 18 | CB | VAL | 10 | 6.293 | 63.902 | 25.842 | 1.00 | 46.39 |
| ATOM | 19 | CG1 | VAL | 10 | 7.303 | 62.782 | 25.841 | 1.00 | 46.41 |
| ATOM | 20 | CG2 | VAL | 10 | 6.952 | 65.135 | 26.436 | 1.00 | 46.79 |
| ATOM | 21 | C | VAL | 10 | 5.616 | 62.885 | 23.653 | 1.00 | 46.17 |
| ATOM | 22 | O | VAL | 10 | 6.521 | 62.384 | 22.991 | 1.00 | 46.18 |
| ATOM | 23 | N | GLU | 11 | 4.423 | 62.317 | 23.768 | 1.00 | 45.28 |
| ATOM | 24 | CA | GLU | 11 | 4.159 | 61.071 | 23.069 | 1.00 | 45.19 |
| ATOM | 25 | CB | GLU | 11 | 2.905 | 60.393 | 23.616 | 1.00 | 45.21 |
| ATOM | 26 | CG | GLU | 11 | 3.105 | 59.709 | 24.967 | 1.00 | 46.05 |
| ATOM | 27 | CD | GLU | 11 | 4.224 | 58.664 | 24.957 | 1.00 | 46.30 |
| ATOM | 28 | OE1 | GLU | 11 | 4.350 | 57.918 | 23.948 | 1.00 | 46.28 |
| ATOM | 29 | OE2 | GLU | 11 | 4.963 | 58.583 | 25.972 | 1.00 | 45.66 |
| ATOM | 30 | C | GLU | 11 | 4.002 | 61.345 | 21.580 | 1.00 | 44.48 |
| ATOM | 31 | O | GLU | 11 | 4.068 | 60.430 | 20.755 | 1.00 | 44.48 |
| ATOM | 32 | N | GLN | 12 | 3.807 | 62.614 | 21.239 | 1.00 | 43.86 |
| ATOM | 33 | CA | GLN | 12 | 3.646 | 62.996 | 19.845 | 1.00 | 42.86 |
| ATOM | 34 | CB | GLN | 12 | 2.972 | 64.368 | 19.715 | 1.00 | 44.49 |
| ATOM | 35 | CG | GLN | 12 | 2.833 | 64.840 | 18.259 | 1.00 | 46.49 |
| ATOM | 36 | CD | GLN | 12 | 1.986 | 66.099 | 18.113 | 1.00 | 47.74 |
| ATOM | 37 | OE1 | GLN | 12 | 2.055 | 66.799 | 17.088 | 1.00 | 48.30 |
| ATOM | 38 | NE2 | GLN | 12 | 1.174 | 66.388 | 19.131 | 1.00 | 47.51 |
| ATOM | 39 | C | GLN | 12 | 5.014 | 63.023 | 19.192 | 1.00 | 41.14 |
| ATOM | 40 | O | GLN | 12 | 5.139 | 62.739 | 18.002 | 1.00 | 41.76 |
| ATOM | 41 | N | ILE | 13 | 6.038 | 63.360 | 19.971 | 1.00 | 38.51 |
| ATOM | 42 | CA | ILE | 13 | 7.398 | 63.388 | 19.450 | 1.00 | 36.48 |
| ATOM | 43 | CB | ILE | 13 | 8.274 | 64.351 | 20.261 | 1.00 | 35.85 |
| ATOM | 44 | CG2 | ILE | 13 | 9.731 | 64.228 | 19.827 | 1.00 | 35.71 |
| ATOM | 45 | CG1 | ILE | 13 | 7.740 | 65.777 | 20.079 | 1.00 | 35.77 |
| ATOM | 46 | CD1 | ILE | 13 | 8.584 | 66.867 | 20.710 | 1.00 | 35.91 |
| ATOM | 47 | C | ILE | 13 | 8.018 | 61.981 | 19.452 | 1.00 | 36.01 |
| ATOM | 48 | O | ILE | 13 | 8.572 | 61.528 | 18.442 | 1.00 | 35.99 |
| ATOM | 49 | N | LEU | 14 | 7.903 | 61.288 | 20.580 | 1.00 | 34.88 |
| ATOM | 50 | CA | LEU | 14 | 8.430 | 59.934 | 20.711 | 1.00 | 33.91 |
| ATOM | 51 | CB | LEU | 14 | 8.230 | 59.432 | 22.141 | 1.00 | 33.29 |
| ATOM | 52 | CG | LEU | 14 | 8.853 | 60.321 | 23.215 | 1.00 | 33.43 |
| ATOM | 53 | CD1 | LEU | 14 | 8.510 | 59.781 | 24.594 | 1.00 | 33.04 |

METHOD, APPARATUS AND SYSTEM FOR PREDICTIVE POWER REGULATION TO A MICROELECTRONIC CIRCUIT

CROSS REFERENCE TO RELATED APPLICATIONS

This application includes subject matter that is related to and claims priority from the following U.S. Utility patent application: Ser. No. 09/945,187 (filed on Aug. 31, 2001 and entitled, "APPARATUS AND SYSTEM FOR PROVIDING TRANSIENT SUPPRESSION POWER REGULATION"). In addition, this application includes subject matter that is related to and claims priority from the following U.S. Provisional Patent Applications: Ser. No. 60/277,494 (filed Mar. 21, 2001 and entitled "POWER SUPPLY TRANSIENT SUPPRESSION THROUGH DYNAMIC PRE-CHARGING"); and Ser. No. 60/277,496 (filed Mar. 21, 2001 and entitled "DUAL LOOP REGULATOR USING A NONLINEAR WIDE-BAND LOOP").

FIELD OF INVENTION

The present invention relates generally to power regulation systems and, in particular, to power regulation systems, devices, and methods suitable for providing predictive transient suppression to microelectronic devices.

BACKGROUND OF THE INVENTION

Power supplies for microelectronic devices are typically configured for providing regulated power to electrical loads. Prior art voltage regulators are generally configured to maintain the voltage, supplied to a dynamic load, at a nominal operating load voltage. Typical prior art voltage regulators (e.g., a switching regulator) may be effective in tracking the slow power changes in the dynamic load; however, due to its relatively low bandwidth, the voltage regulators may not be able to suitably track fast changes. Prior art power regulation systems may also include a bypass capacitor to filter the dynamic switching currents generated by the switching regulator or transient changes in the dynamic load current.

During operation of a dynamic load, transient power events may occur as a result of, for example, several switches within the load switching in a direction at about the same time. If such transient events are not accounted for, they may cause droops or spikes on the power supply, which may in turn deleteriously effect the performance of the load. As clock rates and circuit density of loads increase, the magnitude and/or frequency of the voltage droop's or spike's typically increases. Prior art voltage regulators are generally not effective at sufficiently compensating for droops and spikes generated by transient load conditions.

Figure 1:
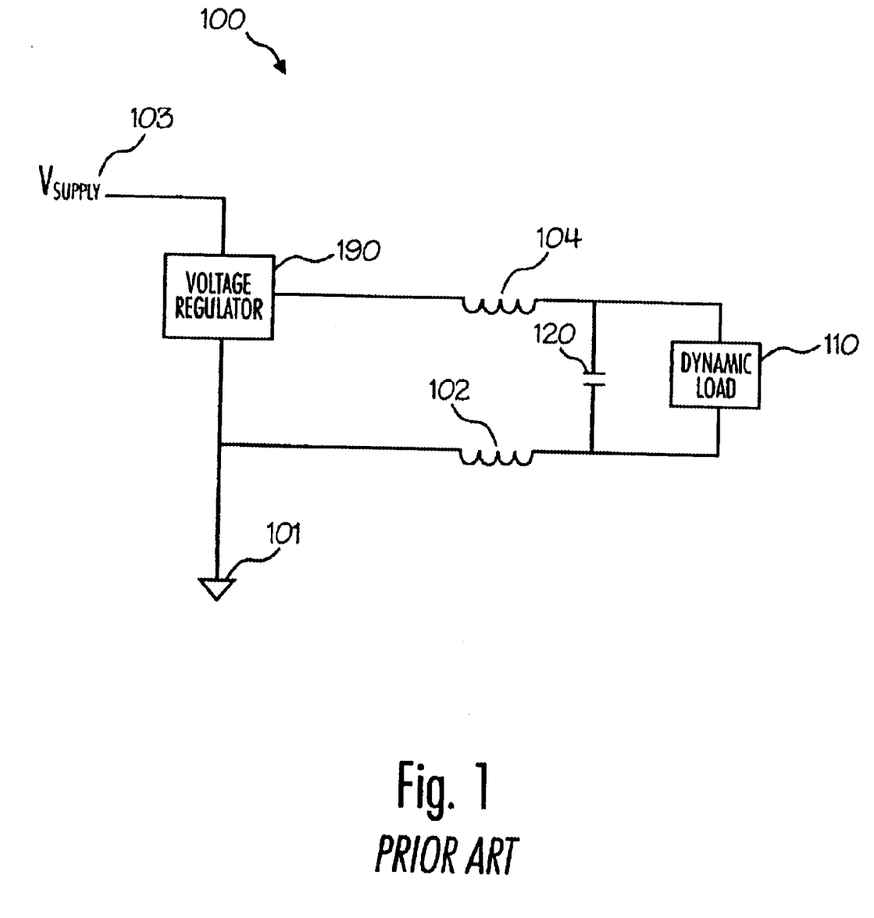
FIG. 1 illustrates a prior art voltage regulator.

FIG. 1 depicts a typical prior art voltage regulation device 100. Regulation device 100 is configured to provide operating power to dynamic load 110. During operation, dynamic load 110 may generate high frequency transient events. The internal circuitry activity level may also vary depending on the function the circuit is performing at any given time. Thus, dynamic load 110 may also contain time varying characteristics.

As illustrated, system 100 includes a supply voltage 103 coupled to dynamic load 110 through a voltage regulator stage 190, which is coupled to ground 101. Voltage regulator 190 is coupled to dynamic load 110 through a supply inductance 104 and a ground inductance 102.

Various reactive transient suppression regulation devices have been developed that reduce the magnitude of voltage droops or spikes by sensing changes in the current to (or in the voltage across) dynamic load 110 and reacting to these changes. While such regulators may be suitable for a variety of applications, reactive regulation devices may exhibit some delay in responding to a transient event. Therefore, a new power regulation system is desirable for effective suppression of transients.

SUMMARY OF THE INVENTION

In accordance with an exemplary embodiment of the present invention, a transient suppression system is configured for providing power regulation and transient suppression regulation to a microelectronic device. In accordance with one aspect of this embodiment, the transient suppression regulator is configured to adjust the charge supplied to a microelectronic device in response to the predictive transient event signal.

In accordance with another aspect of the present invention, the transient suppression regulator includes a direct charge supply element which may be configured to directly source or sink current to a microelectronic device as driven by a predictive transient event signal and in anticipation of a transient event. In accordance yet another aspect of the present invention, the transient suppression regulator includes a pre-adjust stage which may be configured to pre-charge or pre-discharge a bypass capacitor as driven by a predictive transient event signal and in anticipation of a transient event.

BRIEF DESCRIPTION OF THE DRAWING

These and other features, aspects and advantages of the present invention may be better understood with reference to the following description, appended claims, and accompanying figures where:

FIGS. 3 and 4 illustrate, in circuit format, exemplary transient suppression devices in accordance with various aspects of the present invention.

DETAILED DESCRIPTION

The present invention relates to a power regulation system suitable for providing regulated power to a microelectronic device. Although the power regulation system and method of the present invention may be used to supply power to a variety of microelectronic devices, the invention is conveniently described herein with reference to supplying power to a microprocessor.

The power regulation system and method of the present invention are configured to facilitate suppression of transient load conditions based on a predictive event at the microelectronic device. In accordance with various embodiments of the present invention, the system and method anticipate transient events before the occurrence of the transient event and provide suppression by adjusting power to the transient load. The suppression may be provided either before or after the start of the transient event. The suppression of transients may be realized via predictive transient suppression techniques or a combination of predictive and reactive transient suppressor techniques.

In accordance with one exemplary embodiment of the present invention, a dynamic load is configured to generate and provide a predictive transient event signal to a power supply. In this case, the power supply is configured to receive the predictive transient event signal and to adjust the charge supplied to the load in anticipation of the predicted load transient. In this manner, predictive adjustments in the power supplied to the dynamic load provide a "head start", or "headroom", that may allow more time for the power regulator to react to the transient activity without causing a droop or spike to exceed a tolerance range.

The predictive transient event signal may be any signal capable of indicating that the dynamic load will change its power usage in the future. Various electronic devices and microprocessors make load transient prediction possible because they perform observable preparatory steps before initiating/terminating power consuming activities.

Exemplary preparatory actions may include: the sending of enable signals, the activity on specific circuits or portions thereof, or the sending of instructions. Furthermore, many other preparatory actions may provide indications of future changes in load power demands. Various enable signals may indicate the initiation/termination of power consuming activity. Block enable signals, for example, may be sent by a microprocessor to turn on or turn off a block of circuits that are used to perform computations. In another example, clock enable signals may be sent by the microprocessor to control a gated clock circuit. This clock enable may indicate the initiation/termination of a power consuming process, such as transmitting data. The microprocessor may further generate an output enable signal to turn on an output device. Furthermore, an enable signal may include any signal that commands a subset of circuits to start or stop a power consuming activity. The subset of circuits may be on the microprocessor or on a peripheral device and the signal may be generated on or off the microprocessor. In one aspect of the present invention, the enable signals are the predictive transient event signals. In other exemplary embodiments of the present invention, these enable signals may be converted into predictive transient event signals for use by a power regulation system.

Activity on specific circuits may also indicate the initiation/termination of power consuming activity. In other words, observable changes in the current or voltage of specific circuits may predict the future power demands of the microprocessor. For example, when a microprocessor begins processing a number of instructions on a particular buffer tree, the increased current to that buffer tree may indicate the future occurrence of some load changing activity. As another example, a clock driver may be started prior to initiating communication with another microprocessor. The clock driver may draw more current when toggling than in its quiescent state. Therefore, the increased current can be sensed and interpreted to predict that the coming communications session will be a significant power increase on the load. Thus, a predictive transient event signal can be generated representing changes in current or voltage levels at specific portions of the microprocessor or peripheral devices.

In like manner, a predictive transient event signal can be generated when instructions, such as those from controllers, schedulers, and the like, indicate the initiation of or termination of power consuming activities. For example, instructions to a printer or modem may indicate future processing or other load changing pre-transient activity on a dynamic load. Pre-transient activity is an activity which often or always precedes a transient event. Therefore, a predictive transient event signal may result from: preparatory activity identifiable by an enable signal causing the preparatory activity, a signal from a sensing device sensing the preparatory activity, or instructions from a controller or scheduler initiating or terminating an activity. Furthermore, the predictive transient event signal may comprise other signals indicative of these preparatory steps.

In addition, predictive transient event signals can be received from multiple sources and from monitoring many different power consuming processes. In one embodiment, the multiple predictive transient event signals may each individually cause pre-adjustments to the voltage level. In other embodiments, the multiple predictive transient event signals may be combined, averaged, weighted, or otherwise processed to represent the combined power changes. Moreover, statistical probabilities may also be used in the event that, for example, the predictive transient event signal indicates a 90% probability of an increase in power consumption. In other words, the magnitude of pre-adjustments to the voltage level may depend on the probability of transient event occurrence.

The power supply may be configured in various ways to receive the predictive transient event signals and to adjust the charge supplied to the load in anticipation of a predicted load transient. In an exemplary embodiment of the present invention, the power supply comprises a transient suppressor device. In one exemplary aspect of the present invention, the transient suppressor device includes a charge supply element. In this case, the charge supply element is configured to directly source or sink current to the load in response to a predictive transient event signal. Various configurations may suitably adjust the charge provided to the load in response to the predictive transient event signal.

In accordance with another exemplary aspect of the present invention, the transient suppressor includes a transient capacitance adjusting ("pre-adjust") stage. In this case, the pre-adjust stage is configured to directly charge or discharge a capacitive element (e.g., a by-pass capacitor) in anticipation of transient events. In yet another exemplary aspect of the present invention, the transient suppressor includes a voltage regulator stage. The voltage regulator stage may be configured to receive the predictive transient event signal and to adjust power supplied to the dynamic load in response to the predictive transient event signal. For example, the voltage regulator may be configured to adjust the voltage across the capacitive element in response to the predictive transient event signal.

Figure 2:
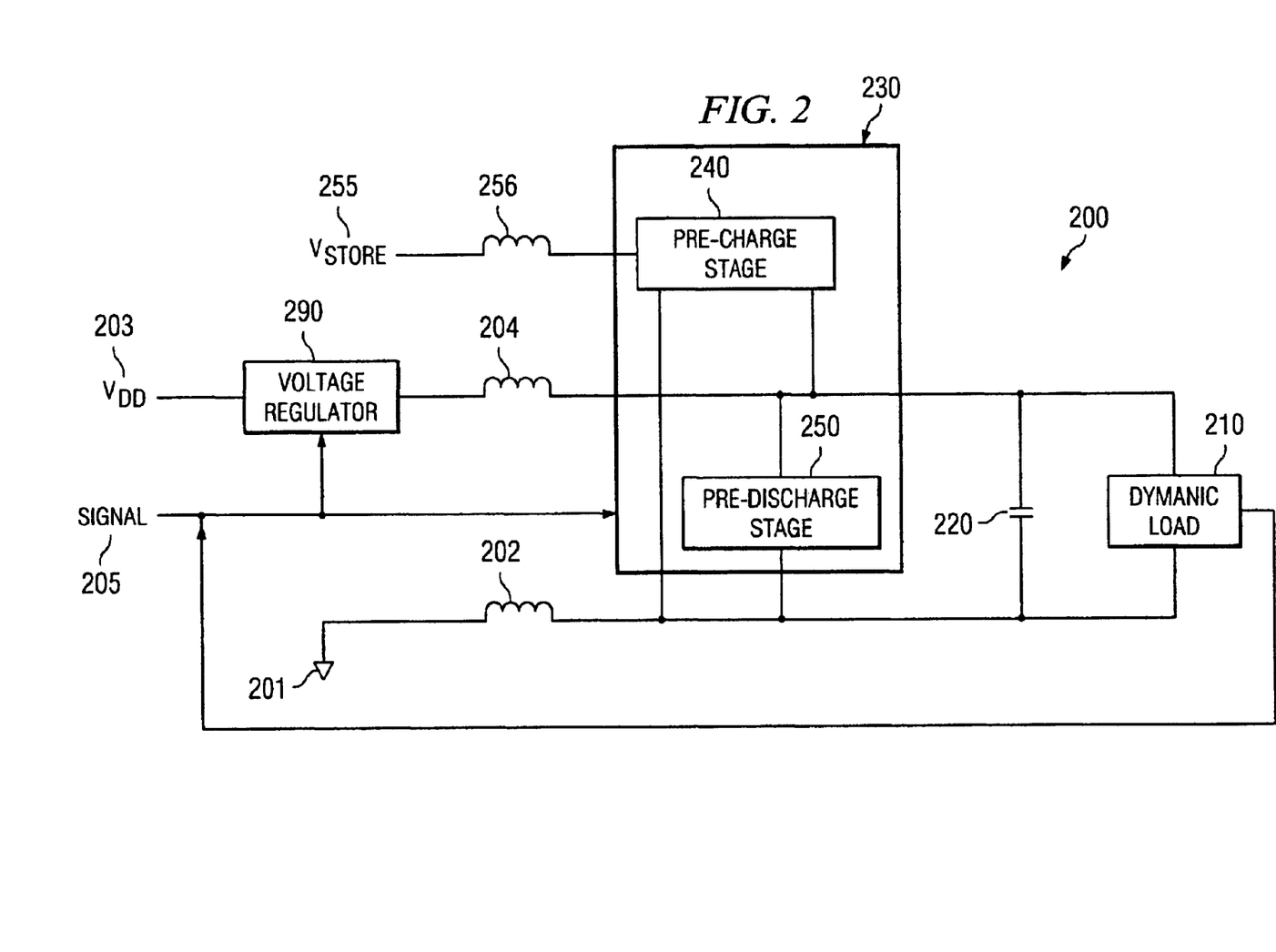
FIG. 2 illustrates, in block format, an exemplary power regulation system, including a transient suppression device in accordance with an aspect of the present invention.

As illustrated in FIG. 2, a dynamic predictive transient suppression system 200 in accordance with one aspect of the present invention includes a pre-adjust stage 230 coupled to a capacitive element 220 which is suitably coupled to a dynamic load 210. Dynamic predictive transient suppression system 200 may further include other devices and subcomponents. For example, the system may also include a voltage regulation stage 290. In various embodiments, multiple pre-adjust stages may be configured to receive one or more of multiple predictive transient event signals.

As discussed above, dynamic load 210 may be any microelectronic device such as a microprocessor, microcontroller, or the like. In accordance with one aspect of the present invention, dynamic load 210 is configured to provide at least one predictive transient event signal. In another aspect of the present invention, dynamic load 210 is configured to provide a signal that can be interpreted, by the microprocessor or the power supply, to create at least one predictive transient event signal. For example, a signal to a printer or modem may indicate future processing or other load changing activity on dynamic load 210.

Capacitive element 220 may comprise, for example, one or more capacitive elements located in one or more devices.

For example, capacitive element 220 may include one or more capacitive elements on the microprocessor. Furthermore, capacitive element 220 may include one or more capacitive elements on a motherboard. Capacitive element 220 may also be located within the power supply. In addition, the capacitive element 220 may be a part of two or more of these devices. In another aspect of the present invention, capacitive element 220 is part of an integrated circuit, although discrete component capacitors may also be used. In accordance with an exemplary aspect of the present invention, capacitive element 220 is a bypass capacitor which may be located as described above.

In accordance with one aspect of the present invention, predictive transient suppression system 200 may include a pre-charge/discharge stage ("pre-adjust stage") 230. Pre-adjust stage 230 is configured to adjust the charge on the capacitive element (e.g., bypass capacitor) in anticipation of a transient event. Pre-adjust stage 230 may include a pre-charge stage 240 and a pre-discharge stage 250. In this embodiment, pre-charge stage 240 includes one or more capacitive elements (e.g., capacitors) which may be charged by power source Vstore 255. The one or more charge supplying elements are configured to selectively add charge to the charge supply element. Pre-discharge stage 250 is configured to discharge a portion of the charge on capacitive element 220. Furthermore, pre-adjust stage 230 may include any circuit configuration that can selectively add or remove a portion of the charge on capacitive element (e.g., bypass capacitor) 220. Pre-adjust stage 230 may also be configured to receive, via signal line 205, a predictive transient event signal.

In one aspect of the present invention, predictive transient suppression system 200 additionally, or as an alternative to pre-adjust stage 230, includes a voltage regulation stage 290. Voltage regulation stage 290 is configured to receive a predictive transient event signal and to suitably adjust the voltage across capacitive element (e.g., bypass capacitor) 220 based on the predictive transient event signal. In one aspect of the present invention, voltage regulation stage 290 includes a power integrated circuit ("power IC") and a controller. The controller is configured to receive a predictive transient event signal over predictive transient event signal line 205. In this case, the controller is configured to drive the power IC to adjust the amount of charge stored on the bypass capacitor. The power regulator may comprise, for example, a switching regulator (e.g., Buck Regulator) or linear regulator. For example, the controller may change the duty cycle of the voltage regulator, may use active voltage positioning, may synchronize multiple power switches, or may use other methods to rapidly charge or discharge the capacitor.

In another aspect of the present invention, the power IC may be configured to receive the predictive transient event signal directly and to adjust the amount of charge provided by the power IC to the microprocessor in response to the predictive transient event signal. In accordance with yet another aspect of the present invention, the direct charge supply element, the pre-adjust stage 230, and the voltage regulation stage 290 may be selectively and suitably combined and configured to address transients based on the predictive transient event signal. In addition, these embodiments may be combined with reactive transient suppression methods.

Figure 3:
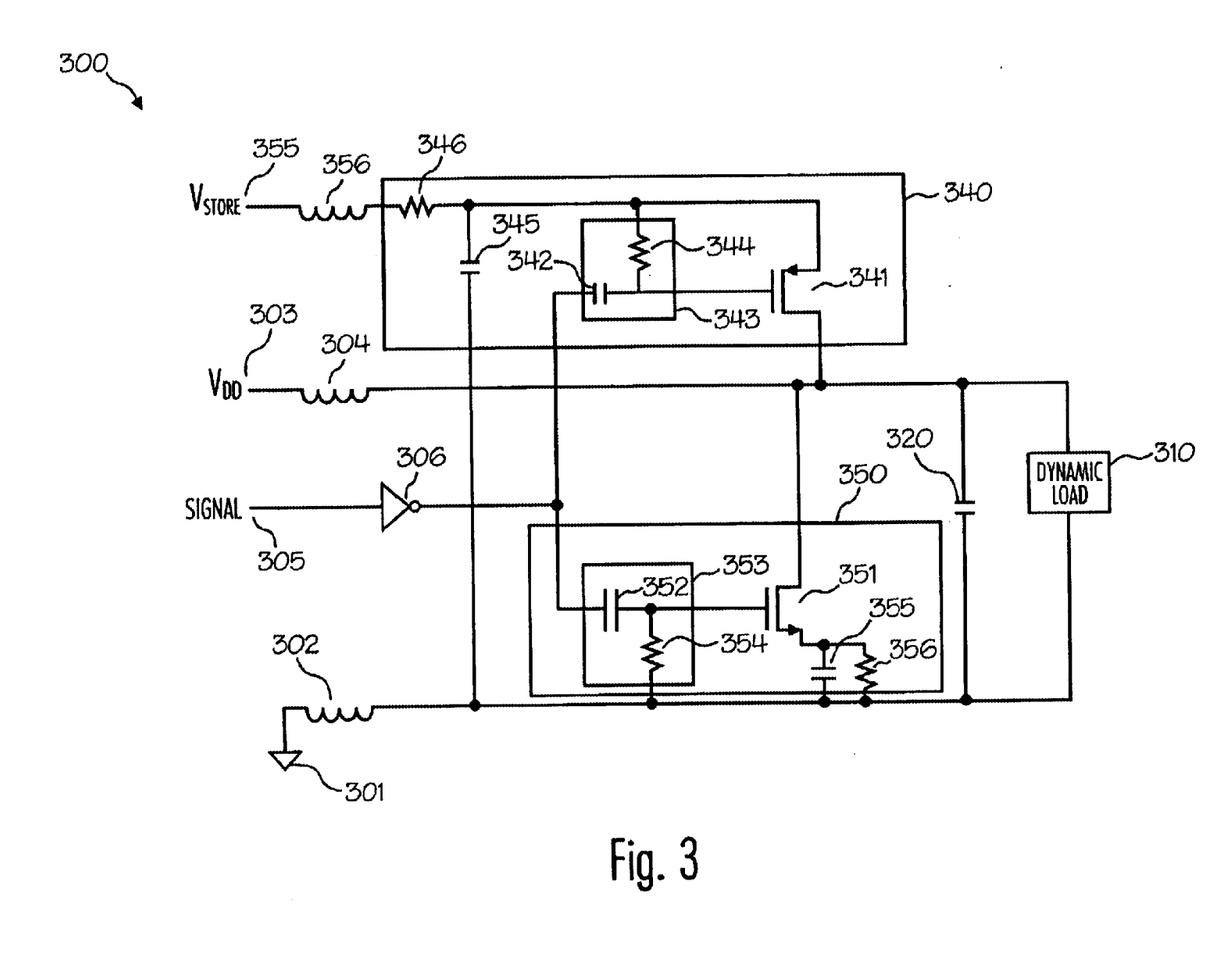

FIG. 3 illustrates an exemplary predictive transient power suppression circuit 300 for supplying or removing charge to the microprocessor in anticipation of a transient event. In this exemplary embodiment, signal line 305 is configured to communicate a predictive transient event signal. The predictive transient event signal may, for example, drive a dynamic pre-charging stage 340 or discharging stage 350. These stages may selectively increase or decrease, respectively, the charge on a capacitive element, such as a bypass capacitor 320. This temporary adjustment may increase the "ahead room" for a coming transient event.

Pre-charge stage 340 may, for example, include a pre-charge storage capacitor 345 and a charge resistor 346. Pre-charge storage capacitor 345 may be configured in parallel with bypass capacitor 320 such that charge on capacitor 345 can be selectively transferred to capacitor 320. In addition, pre-charge storage capacitor 345 may comprise other charge storage elements. Charge resistor 346 may allow slow charging of the storage capacitor 345.

Pre-discharge stage 350 may be configured to discharge a portion of the charge on bypass capacitor 320 directly to ground. However, in this embodiment, the length of time that the capacitor is connected to ground may be regulated such that only a portion of the charge is removed from bypass capacitor 320. In another exemplary embodiment, discharge stage 350 includes both a discharge element such as a discharge capacitor 355 and a discharge resistor 356. Charge may be transferred from bypass capacitor 320 to discharge capacitor 355 and then the charge on capacitor 355 may be removed through discharge resistor 356.

Predictive transient suppression circuit 300 may suitably comprise control circuitry. The control circuitry may, for example, be configured to selectively connect the pre-charge and discharge stages for charging and discharging bypass capacitor 320. An inverter 306 may suitably be used to generate the proper polarity to coordinate the pre-charge with an increase in the dynamic load current and the pre-discharge with a decrease in the dynamic load. The activity change may be detected through a high-pass filter 343 formed by capacitor 342 and resistor 344. PFET 341 serves as a switch through which the voltage supply bypass cap 320 is charged from the stored charge on capacitor 345. Similarly, the activity change may be detected through a high-pass filter 353 formed by capacitor 352 and resistor 354. NFET 351 serves to discharge bypass capacitor 320. Once pre-charging/discharging has occurred, the pre-charge or discharge capacitor may then be recharged/discharged so that another pre-charging/discharging event can be supported. Pre-charging may occur through voltage source 355 ($V_{store}$) and resistor 346.

In the present embodiment, $V_{store}$ is at a higher voltage level compared to $V_{dd}$. For example, may be at 5V, while $V_{dd}$ is 1.8 V. Other voltage levels may be selected where $V_{store}$ is somewhat bigger than $V_{dd}$, such that a motive force exists to move charge from storage capacitor 345 to bypass capacitor 320. Using a relatively large value on $V_{store}$ may facilitate the use of smaller capacitors 345 while not sacrificing the amount of charge that can be added to bypass capacitor 320. Moreover, the use of smaller capacitors 345 facilitates using the space on the integrated circuit to make the bypass capacitor 320 larger.

In accordance with this embodiment, if the dynamic load power usage is about to increase, the predictive transient event signal may switch from 0 to 1 and activate PFET 341 to raise the output voltage of the power supply such that the droop begins at a slightly higher voltage level. In this manner, the voltage can droop further before falling outside a suitable window, thus allowing more time for the voltage regulator or other systems to address the transient event. The high-pass filter may be configured such that changes occur only at the transitions between 0 and 1. Other logical circuitry and switches may also be used to achieve precharging and pre-discharging of a capacitive element in a transient suppression circuit.

Although various embodiments of the present invention have been described as including both a voltage source $V_{dd}$ and second voltage source $V_{store}$, in another aspect of the present invention, a predictive transient suppression circuit comprises a single voltage source $V_{dd}$. For example, and with reference to FIG. 4, a predictive transient suppression circuit 400 supplies a dynamic load 410 with power from a voltage source $V_{dd}$ 403. A capacitive element, such as bypass capacitor 420, is configured in parallel with dynamic load 410.

Furthermore, two charge adjusting elements (e.g., capacitors) are configured to be selectively connected in series or in parallel with each other. The charge adjusting capacitors may be configured such that the combination of the two capacitors is in parallel with bypass capacitor 420. For example, transient suppression circuit 400 may comprise two pre-storage capacitors 410 and 416. The voltage source 403 may be coupled to ground 401 through supply inductance 404, transistor 408, a first charge adjusting capacitor 410, and ground inductance 402. In a second path, voltage source 403 may be coupled to ground through supply inductance 404, a second charge adjusting capacitor 416, transistor 418, and ground inductance 402. In addition, transistors 412 and 414 are connected in parallel with each other, with emitters connected to collectors, and the combination connected to the node between transistor 408 and first charge adjusting capacitor 410 and between transistor 418 and second charge adjusting capacitor 416.

A signal line 405 may be configured to communicate a predictive transient event signal to transistors 408 and 412. An inverter 406 may be configured to invert the predictive transient event signal and communicate the inverted signal to transistors 418 and 414. The predictive transient event signal may, for example, switch from 0 to 1 when a device is being enabled and from 1 to 0 when a device is being disabled. Therefore, when a device is disabled, the predictive transient event signal provides a 0 to transistor 408 and 412 and a 1 to transistors 414 and 418. This causes transistors 408 and 418 to be on and transistors 412 and 414 to be off. Thus first and second charge adjusting capacitors 410 and 416 are in parallel with each other and may each charge to a maximum value of $V_{dd}$.

When a device is being enabled, i.e., when the predictive transient event signal indicates that an increase in dynamic load power is about to occur, the enable signal changes from 0 to 1 causing transistors 408 and 418 to turn off and transistors 412 and 414 to turn on placing the storage capacitors 416 and 410 in series. As each storage capacitor is charged at $V_{dd}$, the combined series charge adjusting capacitors cause 2*$V_{dd}$ volts to be across bypass capacitor 420 which was charged at $V_{dd}$. Therefore, the series charge adjusting capacitors discharge to bypass capacitor 420 raising the voltage level across the bypass capacitor. If for example, the bypass capacitor has 10 times the capacitance of the storage capacitors, then the voltage level would increase by 5%. This 5% increase would last for a short time period in anticipation of an increased load demand. However, the power regulator would eventually return the voltage across bypass capacitor 420 to $V_{dd}$ and across the storage capacitors to $V_{dd}/2$.

Similarly, when a device is being disabled, i.e., when the predictive transient event signal indicates that a decrease in dynamic load power is about to occur, the enable signal changes from 1 to 0 causing transistors 408 and 418 to turn on and transistors 412 and 414 to turn off placing first and second charge adjusting capacitors 416 and 410 in parallel again. As each storage capacitor is charged at $V_{dd}/2$ before the disable signal, the parallel combination of charge adjusting capacitors places the voltage $V_{dd}/2$ in parallel with bypass capacitor 420 which is at a voltage level of $V_{dd}$. Therefore, bypass capacitor 420 discharges to parallel charge adjusting capacitors 410 and 416 lowering the voltage level across the bypass capacitor. If for example, the bypass capacitor has 10 times the capacitance of the storage capacitors, then the voltage level may decrease by 5%. This 5% decrease would last for a short time period in anticipation of a decreased load demand. However, the voltage regulation stage would eventually return the voltage across bypass capacitor 420 and each charge adjusting capacitor to $V_{dd}$.

These approaches can be extended to multiple charging and discharging units which can be tailored to individual blocks of internal circuitry on the microprocessor. This allows the charging and discharging profiles to accurately match the distributed dynamic load characteristics of complex digital integrated circuits. Similarly, these approaches can be combined with other supply regulation techniques, such as closed loop regulation, to suitably suppress transient events. For example, the predictive transient event suppression may be combined with reactive transient event suppression, where the transient suppressor device is further configured to receive a reactive transient event signal and to adjust the charge supplied to the microelectronic device in response to the reactive transient event signal. In one exemplary embodiment, the reactive transient event signal may comprise a signal from a current sense device as described in U.S. patent application Ser. No. 09/945,187, entitled "Apparatus and System for Providing Transient Suppression Power Regulation", filed on Aug. 31, 2001, which is incorporated by reference. In other exemplary embodiment, the reactive transient event signal may comprise a signal from a voltage sense device as described in U.S. Provisional Application Ser. No. 60/277,496, entitled "Dual Loop Regulator Using a Nonlinear Wide-Band Loop", filed Mar. 21, 2001, which is incorporated by reference. In addition, multiple sets of charging and discharging units may be included such that several discharges can occur in rapid succession.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. Many alternative or additional functional relationships or physical connections may be present in a practical predictive transient suppression system.

The present invention has been described above with reference to exemplary embodiments. However, those skilled in the art having read this disclosure will recognize that changes and modifications may be made to the embodiments without departing from the scope of the present invention. For instance, the present invention has been described with a single pre-adjust stage for pre-charging or pre-discharging for transient suppression; it should be recognized, however, that more than one pre-adjust stages may be used for transient suppression depending upon the particular requirements and limitations of the system. Also, in another aspect of the present invention, the microprocessor generates predictive event signal(s) that are provided to the power supply for non-transient, or normal mode, power regulation. In this exemplary embodiment, the power supply includes a voltage regulator or similar device configured to regulate power based on the predictive event signal(s) by adjusting the amount of charge placed on a bypass capacitor across the microprocessor. The predictive event signals are generated in similar manner to the predictive transient event signal, however, they may also indicate future non-transient power changes. These and other changes or modifications are intended to be included within the scope of the present invention, as expressed in the following claims.

What is claimed is:

1. A predictive transient power suppression system comprising:
   a microelectronic device configured to generate a predictive transient event signal and adapted to provide said signal to a transient suppressor device; and
   a transient suppressor device, wherein the transient suppressor device is configured to receive the predictive transient event signal and to adjust the charge supplied to the microelectronic device in response to the predictive transient event signal.

2. The predictive transient power suppression system of claim 1, wherein the transient suppressor device comprises a direct charge supply element configured to adjust the amount of current supplied directly to the microlectronic device.

3. The predictive transient power suppression system of claim 1, wherein the transient suppressor device comprises a pre-adjust stage and a capacitive element.

4. The predictive transient power suppression system of claim 1, wherein transient suppressor device comprises a voltage regulator and a capacitive element.

5. The predictive transient power suppression system of claim 1, wherein transient suppressor device comprises a voltage regulator, a pre-adjust stage, and a capacitive element.

6. The predictive transient power suppression system of claim 4, wherein the voltage regulator comprises a power integrated circuit configured to receive the predictive transient event signal.

7. The predictive transient power suppression system of claim 4, wherein voltage regulator comprises a controller configured to receive the predictive transient event signal and the controller is configured to drive a power integrated circuit.

8. The predictive transient power suppression system of claim 1, wherein the microelectronic device is configured to perform a pre-transient activity.

9. The predictive transient power suppression system of claim 8 wherein the predictive transient signal is an instruction to perform the pre-transient activity.

10. The predictive transient power suppression system of claim 1, wherein the predictive transient event signal is an enable system.

11. The predictive transient power suppression system of claim 1, wherein the predictive transient signal represents a change in the power usage of a circuit.

12. The predictive transient power suppression system of claim 3, wherein the capacitive element is a bypass capacitor configured in parallel with the microelectronic device.

13. The predictive transient power suppression system of claim 1, wherein the transient suppressor device comprises at least one capacitive element and more than one pre-adjust stage configured in an array.

14. The predictive transient power suppression system of claim 13, wherein each of the more than one pre-adjust stages is configured to receive at least one of a plurality of predictive transient event signals and to individually adjust the charge supplied to the miocroelectronic device in response to the at least one of a plurality of predictive transient event signals.

15. The predictive transient power suppression system of claim 1, wherein the transient suppressor device is further configured to receive a reactive transient event signal and to adjust the charge supplied to the microelectronic device in response to the reactive transient signal.

16. The predictive transient power suppression system of claim 1, wherein the reactive transient event signal comprises a current sense reactive transient event signal.

17. The predictive transient power suppression system of claim 1, wherein the reactive transient event signal comprises a voltage sense reactive transient event signal.

18. A method for regulating voltage to a variable load, the method comprising the steps of:
   generating a predictive transient event signal; and
   providing the predictive transient event signal to a circuit that is coupled to the variable load; and
   adjusting the charge provided to the variable load based on the predictive transient event signal.

19. The method of claim 18 further comprising the step of providing the predictive transient signal to a transient suppressor device.

20. The method of claim 19 wherein the transient suppressor device comprises a pre-adjust stage configured to adjust the charge supplied to a microelectronic device in anticipation of a transient event.

21. The method of claim 19 wherein the transient suppressor device comprises a voltage regulation stage configured to adjust the charge supplied to a microelectronic device in anticipation of a transient event.

22. The method of claim 19, wherein the transient suppressor device compromises both a pre-adjust stage and a voltage regulation stage configured to adjust the charge supplied to a capacitive element in parallel with a microelectronic device on anticipation of a transient event.

23. The method of claim 20 wherein, the adjusting step further compromises adjusting the charge on a bypass capacitor.

24. The method of claim 22, further compromising the step of using reactive transient suppression techniques to suppress a transient event.

25. The method of claim 18, wherein the adjusting step comprises the step of switching to cause a pre-charged storage capacitor to add charge to a bypass capacitor.

26. The method of claim 18, wherein the adjusting step comprises the step of switching to cause the charge on a bypass capacitor to discharge to a pre-discharged storage capacitor.

27. A predictive transient power suppression system comprising:
   a transient suppressor device, wherein the transient suppressor device is configured to receive a predictive transient event signal from a microelectronic device, and wherein the transient suppressor device is configured to adjust the charge supplied to the microelectronic device in response to the predictive transient event signal.

28. A power regulation system comprising:
a microelectronic device configured to generate a predictive event signal; and
a power supply, wherein the power supply is configured to receive the predictive event signal and to adjust the charge supplied to the microelectronic device in response to the predictive event signal, and wherein the power supply comprises a voltage regulator configured to adjust the amount of current supplied to as bypass capacitor across the microelectronic device.

* * * * *